US008140986B2

(12) United States Patent
Zhao (10) Patent No.: US 8,140,986 B2
(45) Date of Patent: Mar. 20, 2012

(54) GENERATING TEST SCENARIOS USING REUSABLE TRIGGERS INDICATING GRAPHICAL USER INTERFACE (GUI) ELEMENTS AND ACTIONS

(75) Inventor: Nai Yan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/863,143

(22) Filed: Sep. 27, 2007

(65) Prior Publication Data

US 2009/0089688 A1   Apr. 2, 2009

(51) Int. Cl.
*G06F 3/00* (2006.01)
*G06F 3/048* (2006.01)

(52) U.S. Cl. ........ 715/762; 715/763; 715/764; 715/765; 715/771

(58) Field of Classification Search ............ 715/202, 715/762, 764, 771, 763, 809, 765
See application file for complete search history.

(56) References Cited

U.S. PATENT DOCUMENTS

| | | | |
|---|---|---|---|
| 5,920,312 A | 7/1999 | Wagner et al. | |
| 6,393,591 B1 | 5/2002 | Jenkins, IV et al. | |
| 6,907,546 B1 | 6/2005 | Haswell et al. | |
| 6,909,874 B2 | 6/2005 | Holtz et al. | |
| 6,978,440 B1 | 12/2005 | Pavela | |
| 7,058,857 B2 | 6/2006 | Dallin | |
| 7,143,361 B2 * | 11/2006 | Ramchandani | 715/763 |
| 7,146,572 B2 * | 12/2006 | Richardson | 715/771 |
| 7,209,851 B2 | 4/2007 | Singh et al. | |
| 7,376,904 B2 * | 5/2008 | Cifra et al. | 715/763 |
| 7,433,852 B1 * | 10/2008 | Bertrand et al. | 706/45 |
| 7,844,036 B2 * | 11/2010 | Gardner et al. | 379/88.08 |
| 2003/0058277 A1 * | 3/2003 | Bowman-Amuah | 345/765 |

(Continued)

OTHER PUBLICATIONS

Feldstein, J., "Model-Based Testing Using IBM Rational Functional Tester", [online], Updated Nov. 28, 2005, [retrieved on Jan. 15, 2009], retrieved from the Internet at <URL: http://www-128.ibm.com/developerworks/rational/library/05/r-31751>, 5 pp.

(Continued)

*Primary Examiner* — Nicholas Augustine
(74) *Attorney, Agent, or Firm* — David W. Victor; Konrad Raynes & Victor LLP (57) ABSTRACT

Provided are an article of manufacture, system, and method for generating test scenarios using reusable triggers indicating graphical user interface (GUI) elements and actions. User input is received defining a plurality of triggers for a graphical user interface (GUI) program. Each trigger associates a user GUI action and a GUI object on which the GUI action is performed. Execution of the GUI action on the GUI object defined in the trigger causes a shift in a state of the GUI program from one static state to another, and wherein the defined triggers are enabled for reuse in multiple test scenarios. User input is received indicating a first order of triggers to test a first scenario of operations of the GUI program. The GUI program executes the GUI actions with respect to the GUI objects defined in the triggers in the indicated first order. User input is received indicating a second order of triggers to test a second scenario of operations of the GUI program. The GUI program executes the GUI actions with respect to the GUI objects defined in the triggers in the indicated second order. At least one of the triggers indicated for the second scenario reuses at least one trigger indicated for the first scenario. The triggers defined in the first and second scenarios are executed to test the GUI program.

25 Claims, 4 Drawing Sheets

U.S. PATENT DOCUMENTS

| | | | |
|---|---|---|---|
| 2004/0113947 A1* | 6/2004 | Ramchandani | 345/771 |
| 2004/0221238 A1* | 11/2004 | Cifra et al. | 715/762 |
| 2004/0225459 A1 | 11/2004 | Krishnaswamy et al. | |
| 2006/0230326 A1 | 10/2006 | Potts et al. | |
| 2006/0259499 A1* | 11/2006 | Moulckers et al. | 707/100 |
| 2008/0066009 A1* | 3/2008 | Gardner et al. | 715/809 |

OTHER PUBLICATIONS

Myers, B.A., "User Interface Software Tools", ACM Transactions on Computer-Human Interaction, vol. 2, No. 1, Mar. 1995, pp. 64-103.

Robinson, H., "Intelligent Test Automation", Software Testing and Quality Engineering, Sep./Oct. 2000, pp. 24-32.

Black, R., "Investing in Software Testing: Manual or Automated?", 2002, 5 pp.

Blackburn, M., R. Busser, and A. Nauman, "Understanding the Generations of Test Automation", Software Productivity Consortium, 2003, pp. 1-15.

Fewster, M., and D. Graham, "Software Test Automation: Effective Use of Test Execution Tools", Aug. 1999, p. 520, ACM Press, New York, 5 pp.

Kaner, C., "Pitfalls and Strategies in Automated Testing", Computer, vol. 30, Iss. 4, Apr. 1997, pp. 114-116.

Linz, T. and M. Daigl, "How to Automate Testing of Graphical User Interfaces", [online], [Retrieved on Mar. 13, 2005], retrieved from the Internet at <URL: http://www.imbus.de/forschung/pie24306/gui/aquis-full_paper-1.3.html>, 7 pp.

Pettichord, B., "Seven Steps to Test Automation Success", [online], Revised Jun. 26, 2001, [Retrieved on Aug. 26, 2007], retrieved from the Internet at <URL: http://www.io.com/~wazmo/papers/seven_steps.html>, 15 pp.

Wikipedia, "GUI Software Testing", [online], Modified Aug. 24, 2007, [retrieved on Aug. 26, 2007], retrieved from the Internet at <URL: http://en.wikipedia.org/wiki/GUI_software_testing>, 4 pp.

Zambelich, K., "Using GUI-based Automated Test Tools to Test Legacy Applications", [online], 1998, [retrieved on Jan. 31, 2005], retrieved from the Internet at <URL: http://www.sqa-test.com/w_paper2.html>, 7 pp.

\* cited by examiner

GENERATING TEST SCENARIOS USING REUSABLE TRIGGERS INDICATING GRAPHICAL USER INTERFACE (GUI) ELEMENTS AND ACTIONS

BACKGROUND OF THE INVENTION

1. Field of the Invention

The present invention relates to a method, system, and article of manufacture for generating test scenarios using reusable triggers indicating graphical user interface (GUI) elements and actions.

2. Description of the Related Art

To perform software quality assurance (QA) on a graphical user interface (GUI) program, the software developer may use an automated testing technique to test the GUI program. GUI test automation techniques seek to replace manual operations by predefined test scripts, so that testing work can be performed more effectively and efficiently using test scripts. The test scripts include code to enter data and perform GUI actions, such as mouse clicks, keyboard strokes, etc., on the GUI program. The automated test scripts are written and executed to simulate human behavior such as mouse click or keyboard input to verify each function of the GUI program.

After test scripts are written, significant maintenance costs may be incurred if GUI objects in the GUI program are modified. In such case, the test scripts must be updated to reflect the changes to the GUI objects. For example, a new button or GUI object may be added, and then the test scripts must be updated to accommodate these changes to the GUI objects in the GUI program.

In certain GUI test development tools, the test developer may create reusable components of a GUI test scenario, where each reusable component comprises a series of actions to perform at a GUI state to transition to a next GUI state and verification tests to perform at a GUI state to verify the values and output at the GUI state. The developer may construct test scenario using the reusable components. Reusability is an important consideration for automated testers to allow them to maintain/write once and reuse n times, and thereby reduce the maintenance effort by (n−1) times.

For these reasons, there is a need in the art for improved techniques for generating test scripts and scenarios to test a GUI program.

SUMMARY

Provided are an article of manufacture, system, and method for generating test scenarios using reusable triggers indicating graphical user interface (GUI) elements and actions. User input is received defining a plurality of triggers for a graphical user interface (GUI) program. Each trigger associates a user GUI action and a GUI object on which the GUI action is performed. Execution of the GUI action on the GUI object defined in the trigger causes a shift in a state of the GUI program from one static state to another, and wherein the defined triggers are enabled for reuse in multiple test scenarios. User input is received indicating a first order of triggers to test a first scenario of operations of the GUI program. The GUI program executes the GUI actions with respect to the GUI objects defined in the triggers in the indicated first order. User input is received indicating a second order of triggers to test a second scenario of operations of the GUI program. The GUI program executes the GUI actions with respect to the GUI objects defined in the triggers in the indicated second order. At least one of the triggers indicated for the second scenario reuses at least one trigger indicated for the first scenario. The triggers defined in the first and second scenarios are executed to test the GUI program.

DETAILED DESCRIPTION

Figure 1:
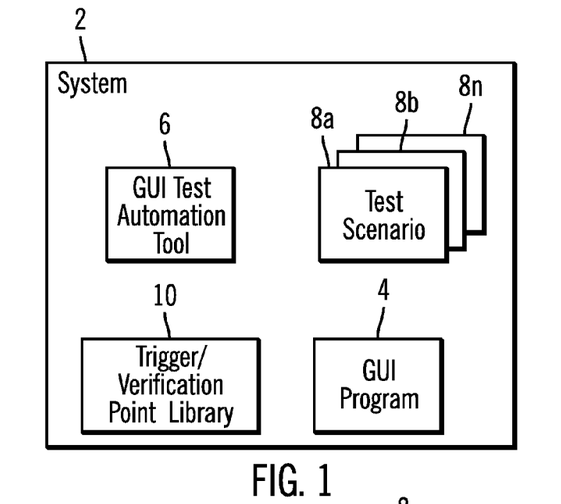
FIG. 1 illustrates an embodiment of a system to test a GUI program.

FIG. 1 illustrates an embodiment of a computing system 2 including program components used to test a graphical user interface (GUI) program 4. The system 2 includes a GUI test automation tool 6 to assist a user to create test scenarios 8a, 8b . . . 8n providing a test script of input and GUI actions to cause the tested GUI program 4 to proceed through various GUI states and test a flow of GUI states with respect to input defined in the test scenarios 8a, 8b . . . 8n. The system 2 further includes a trigger/verification point library 10 comprising reusable triggers and verification points that may be referenced in the different test scenarios 8a, 8b . . . 8n. Each trigger identifies a GUI action and GUI object pair, where the GUI action comprises an action performed by a user, such as a mouse click, keyboard stroke, voice command, etc., and the GUI object indicates a displayed GUI component, such as a depressable button, radio button, check box, icon, etc., that may be affected or activated by the GUI action.

Figure 2:
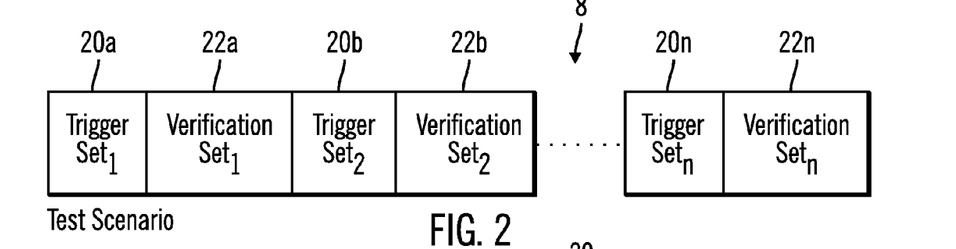
FIG. 2 illustrates an embodiment of a test scenario.

FIG. 2 illustrates an embodiment of a defined test scenario 8, of which test scenarios 8a, 8b . . . 8n comprise an instance, as including an ordered set of one or more items, where each item comprises trigger set and verification set pairs 20a and 22a, 20b and 22b, 20n and 20n.

Figure 3:
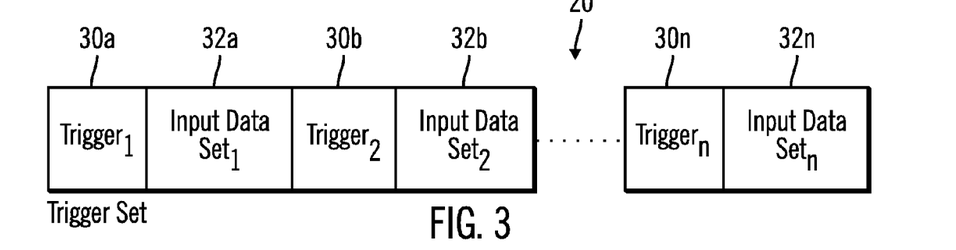
FIG. 3 illustrates an embodiment of a trigger set.

FIG. 3 illustrates an embodiment of a trigger set 20 as including an ordered set of triggers 30a, 30b . . . 30n and input data set 32a, 32b . . . 32n pairs.

Figure 4:
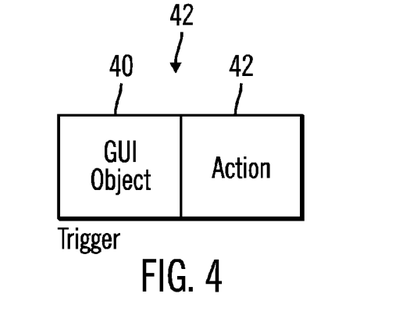
FIG. 4 illustrates an embodiment of a trigger.

FIG. 4 illustrates an embodiment of a trigger 30, such as triggers 30a, 30b . . . 30n, as indicating a GUI action 42 to perform with respect to a GUI object 42 rendered with GUI elements at a GUI state. As discussed, the GUI action 42 may comprise an action performed by a user, such as a mouse click, keyboard stroke, voice command, etc., and the GUI object 40 indicates a displayed GUI component, such as a depressable button, radio button, check box, icon, etc., that may be affected or activated by the GUI action.

The trigger set 20 indicates an ordered set of triggers 30a, 30b . . . 30n that are executed at a GUI state according to the ordering indicated in the trigger set 20. An input data set 32a, 32b . . . 32n may optionally be associated with one or more of the triggers 30a, 30b . . . 30n in the trigger set 20 indicating input data to add to the GUI elements rendered at the state before executing the GUI action 42 associated with the input data set 32a, 32b . . . 32n to transition to a next GUI state in the GUI program 4.

As discussed with respect to FIG. 2, the scenario 8 includes verification sets 22a, 22b . . . 22n associated GUI states resulting from execution of the trigger sets 20a, 20b . . . 20n, where each verification set 22a, 22b . . . 22n includes one or more verification points of verification operations to perform at a GUI state.

Figure 5:
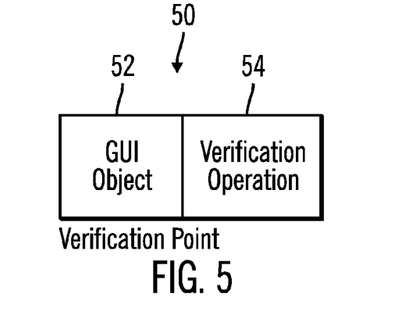
FIG. 5 illustrates an embodiment of a verification point to verify a GUI state.

Each verification point 50 in a verification set 22a, 22b . . . 2n indicates a GUI object 52 and a verification operation 54, where the verification operation 54 is performed with respect to the GUI object 52 at a GUI state to verify the output and values at the GUI state comprise expected GUI elements. After the GUI actions 40 indicated in the triggers 30a, 30b . . . 30n in the trigger set 20a, 20b . . . 20n are executed to transition to a next GUI state, then the verification set 22a, 22b . . . 22n associated with the state resulting from the just executed trigger set 20a, 20b . . . 20n is executed to verify the values at the GUI state. In certain situations, there may be no verification set associated with a GUI state. In such case, the trigger set 20a, 20b . . . 20n associated with that state is executed without performing verification operations with respect to the GUI state with which the trigger set is associated.

Figure 6:
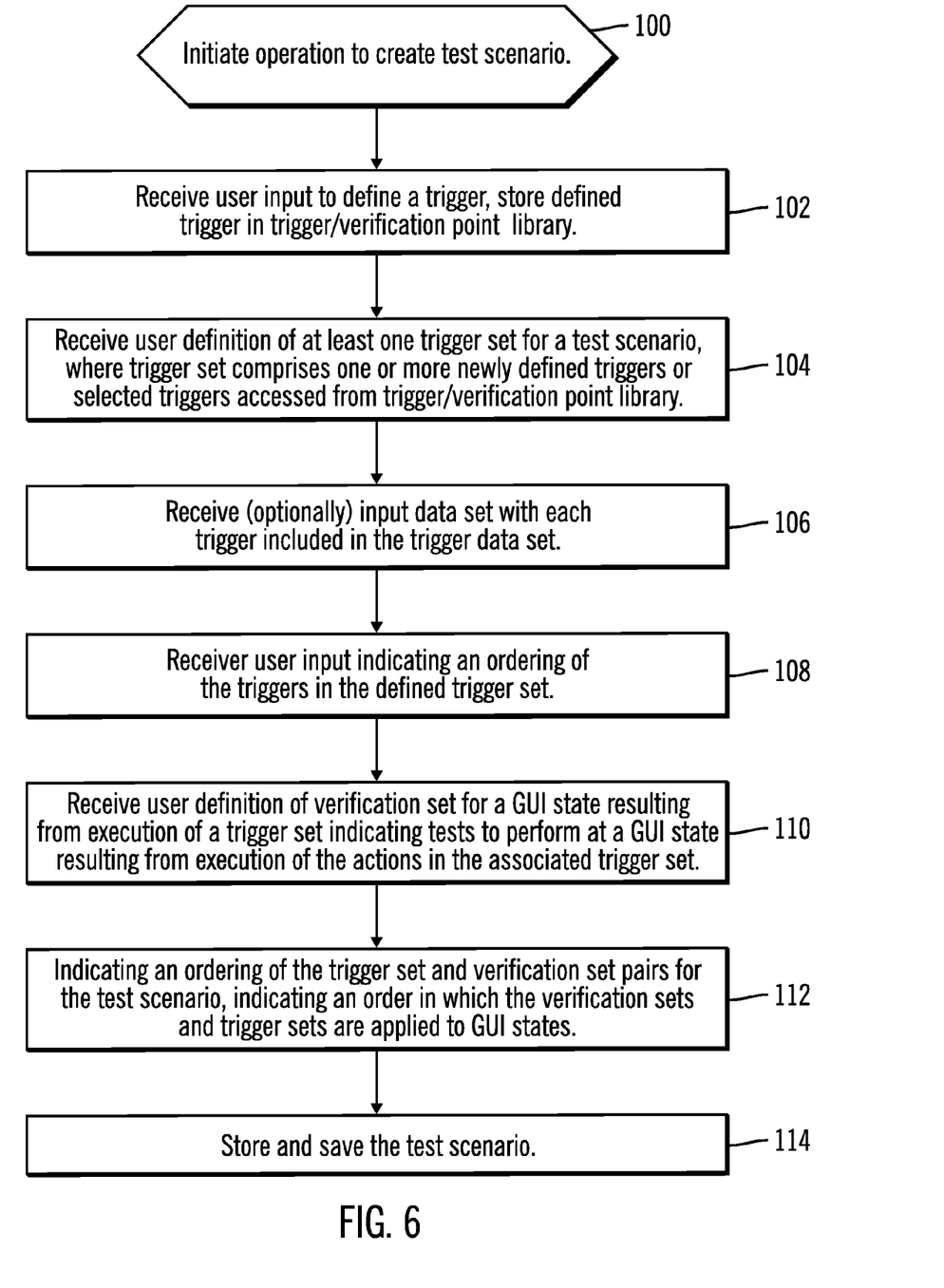
FIG. 6 illustrates an embodiment of operations to generate a test scenario.

FIG. 6 illustrates an embodiment of operations performed by the GUI test automation tool 6 in response to user action via a user interface to create test scenarios 8a, 8b . . . 8n for the GUI program 4. Upon initiating (at block 100) an operation to create a test scenario 8a, 8b . . . 8n, the GUI test automation tool 6, receives (at block 102) user input to define a trigger 30 (FIG. 3) and stores the defined trigger 40 in the trigger/verification point library 40. Each defined trigger 40 indicates a GUI object 40 that would be rendered in a GUI panel or window by the GUI program 4 and the action 42 indicates a user action to perform with respect to that GUI object 40, such as a mouse click, keystroke, etc. The defined trigger may be stored in the trigger/verification point library 10. The GUI test automation tool 6 receives (at block 104) a user definition of at least one trigger set 20a, 20b . . . 20n for a test scenario 8a, 8b . . . 8n, where the trigger set comprises one or more defined triggers 30a, 30b . . . 30n or selected triggers 30a, 30b . . . 30n accessed from the trigger/verification point library 10 in and an ordering of the triggers 30a, 30b . . . 30n in the trigger set 20.

The GUI test automation tool 6 further optionally receives (at block 106) an input data set 32a, 32b . . . 32n with each trigger 30a, 30b . . . 30n included in the trigger set 20, where the data in the input data set 32a, 32b . . . 32n is entered at the GUI elements before the GUI action 42 defined in the associated trigger 30a, 30b . . . 30n is performed. The user may also decline to define an input data set for a trigger, such that the GUI action 42 for the trigger 30a, 30b . . . 30n is performed without entering data from an input data set. The GUI test automation tool 6 further receives (at block 108) user input indicating an ordering of the triggers and input data set pairs 30a and 32a, 30b and 32b . . . 30n and 32n in the trigger set 20.

The GUI test automation tool 6 further receives (at block 110) a user definition of a verification set 22a, 22b . . . 22n for a GUI state resulting from execution of a trigger set 20a, 20b . . . 20n, where each verification set 22a, 22b . . . 2n includes one or more verification points 50 (FIG. 4). Each verification point 50 defines a verification operation 54 (FIG. 5) to perform on the GUI elements rendered at a GUI state resulting from execution of the actions 42 (FIG. 4) in the triggers 30a . . . 30n (FIG. 3) in a trigger set 20a, 20b . . . 20n (FIG. 2) to verify that the GUI state elements match expected values. The GUI test automation tool 6 receives (at block 112) an indication of an ordering of the trigger set and verification set pairs 20a and 22a, 20b and 22b . . . 20n and 22n (FIG. 2) in the test scenario 8 being generated. The generated test scenario 8a, 8b . . . 8n may then be stored (at block 114) for later invocation to test the GUI program 4.

In the described embodiments, different test scenarios 8a, 8b . . . 8n may define trigger sets having the same triggers from the trigger/verification point library 10, such that the test scenarios 8a, 8b . . . 8n each include references to the same triggers in the trigger/verification point library 10. The triggers may be reused in different test scenarios 8a, 8b . . . 8n so that the user does not need to redefine the GUI action for the GUI object each time that action is performed with respect to the object in different test scenarios 8a, 8b . . . 8n. Further, verification points 50 (FIG. 5) may be stored in the library 10 to be available to be selected for reuse in different verification sets 22a, 22b . . . 22n (FIG. 2). In this way, both verification points 50 and triggers 30 may comprise reusable elements that may be selected in different trigger and verification sets defined in the same or different test scenarios.

In certain embodiments, the triggers 30a, 30b . . . 30n defined in the trigger sets 20a, 20b . . . 20n (FIG. 2) and verification points 50 (FIG. 5) defined in verification sets 22a, 22b . . . 22n (FIG. 2) may comprise references to triggers 30 (FIG. 4) and verification points 50 (FIG. 5), respectively, defined in the library 10. Thus, if the GUI program 4 GUI objects and corresponding actions are modified by adding, modifying or deleting certain GUI objects, then such modifications can be reflected in the triggers defined in the trigger/verification point library 10, updating at least one of the GUI object 40 or action 42 for the trigger to reflect the changes made to the GUI program 4 being tested. In such case, after updating the trigger in the trigger/verification point library 10, processing triggers when executing a test scenario 8a, 8b . . . 8n would cause execution of the referenced trigger in the trigger/verification point library 10. Further, after updating a verification point 50 in the library 10, processing the verification point would cause execution of the referenced verification point 50 in the library 10. In this way, multiple test scenarios 8a, 8b . . . 8n may reference the same triggers 30 (FIG. 4) and verification points 50 (FIG. 5) defined in the library 10, and updating the trigger and/or verification point in the library 10 once would cause the test scenarios 8a, 8b . . . 8n to execute the updated trigger and verification point, including the modified GUI object 40, 52 and/or GUI action 42 or GUI verification operation 54.

Figure 7:
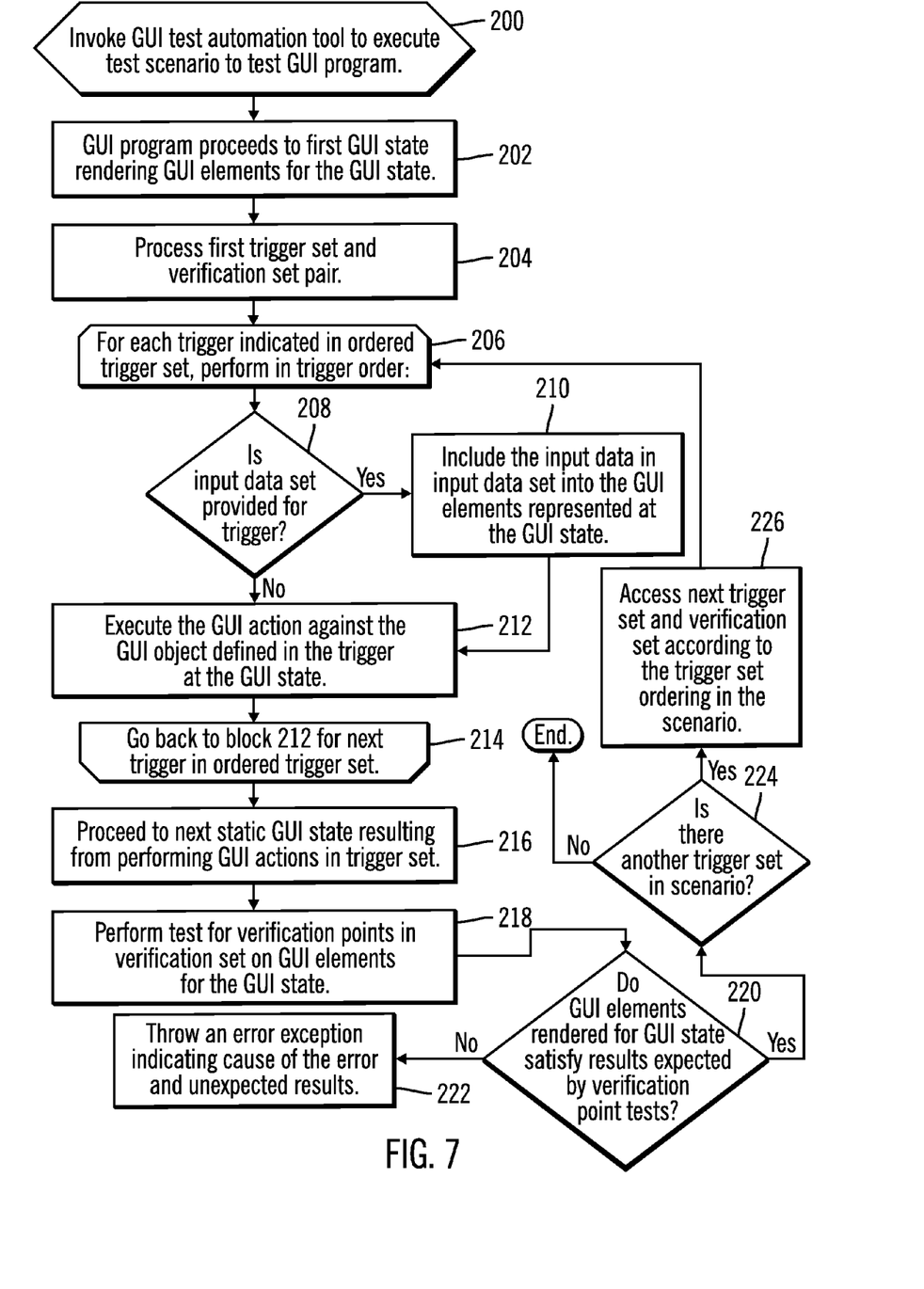
FIG. 7 illustrates an embodiment of operations to execute a test scenario.

FIG. 7 illustrates an embodiment of operations performed by the GUI program 4 in response to the GUI test automation tool 6 executing one of the test scenarios 8a, 8b . . . 8n to test the GUI program 4. Upon invoking (at block 200) the GUI test automation tool 6 to execute one of the test scenarios 8a, 8b . . . 8n to test the GUI program 4, the GUI program 4 proceeds (at block 202) to a first GUI state rendering GUI elements for the first GUI state. The test scenario 8a, 8b . . . 8n processes (at block 204) a first trigger set 20a and verification set 22a pair.

When processing a trigger set 20a, 20b . . . 20n (FIG. 2) a loop of operations is performed at blocks 206 through 214 for each trigger 30a, 30b . . . 30n (FIG. 3) defined in the trigger set 20a, 20b . . . 20n (FIG. 2) currently being processed according to the trigger set order. If (at block 208) an input data set 32a, 32b . . . 32n is provided for the trigger set 30a, 30b . . . 30n being processed, then the input data in the provided input data set 32a, 32b . . . 32n is included (at block 210) in the GUI elements represented at the GUI state. After inserting the input data sets (from block 210) or if there is no input data set for the trigger (from the no branch of block 208), then the GUI action 42 defined in the trigger 30a, 30b . . . 30n being processed is executed (at block 212) with respect to the specified GUI object 40 rendered at the GUI state.

After processing all the triggers 30a, 30b . . . 30n in the trigger set 20a, 20b . . . 20n being processed, the GUI program 4 proceeds (at block 216) to the next static GUI state resulting from performing the GUI actions 42 defined in the triggers 30a, 30b . . . 30n in the processed trigger set 20a, 20b . . . 20n. Upon reaching the new GUI state, tests are performed (at block 218) as defined in the verification points 50 (FIG. 5) in the verification set 22a, 22b . . . 22n associated with the current GUI state. If (at block 220) the GUI elements rendered for the GUI state do not satisfy the results expected by verification point tests in the verification set 22a, 22b . . . 2n, then an error exception is thrown (at block 222) indicating the cause of the error and unexpected results. This exception may end the execution of the test scenario 8a, 8b . . . 8n.

If (at block 220) the GUI elements satisfy the tests specified in the verification set and if (at block 224) there is another trigger set 20b . . . 20n in the test scenario 8a, 8b . . . 8n to process, then control proceeds to block 226 to process the next trigger set 20b . . . 20n. If (at block 224) there are no further trigger sets to process in the test scenario 8a, 8b . . . 8n, then control ends.

With the described embodiments, the test scenario 8a, 8b . . . 8n may define an ordered set of trigger sets of actions to perform, where each trigger indicated in the trigger set may comprise a reusable trigger maintained in a trigger/verification point library 10. Multiple test scenarios 8a, 8b . . . 8n may be defined using the same reusable triggers and verification points in the trigger/verification point library 10. Providing reusable triggers comprising GUI action and object pairs and verification points to test GUI objects at a GUI state that may be reused in different components provides reusability at an item level within the program. This is advantageous over systems that provide reusability at the component level because reusability at the component level does not provide the benefits of reusability at the sub-component level, such as GUI action and object pairs that may be reused in different components.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the article of manufacture implementing the code may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. Of course, those skilled in the art will recognize that many modifications may be made to this configuration without departing from the scope of the present invention, and that the article of manufacture may comprise suitable information bearing medium known in the art.

Figure 8:
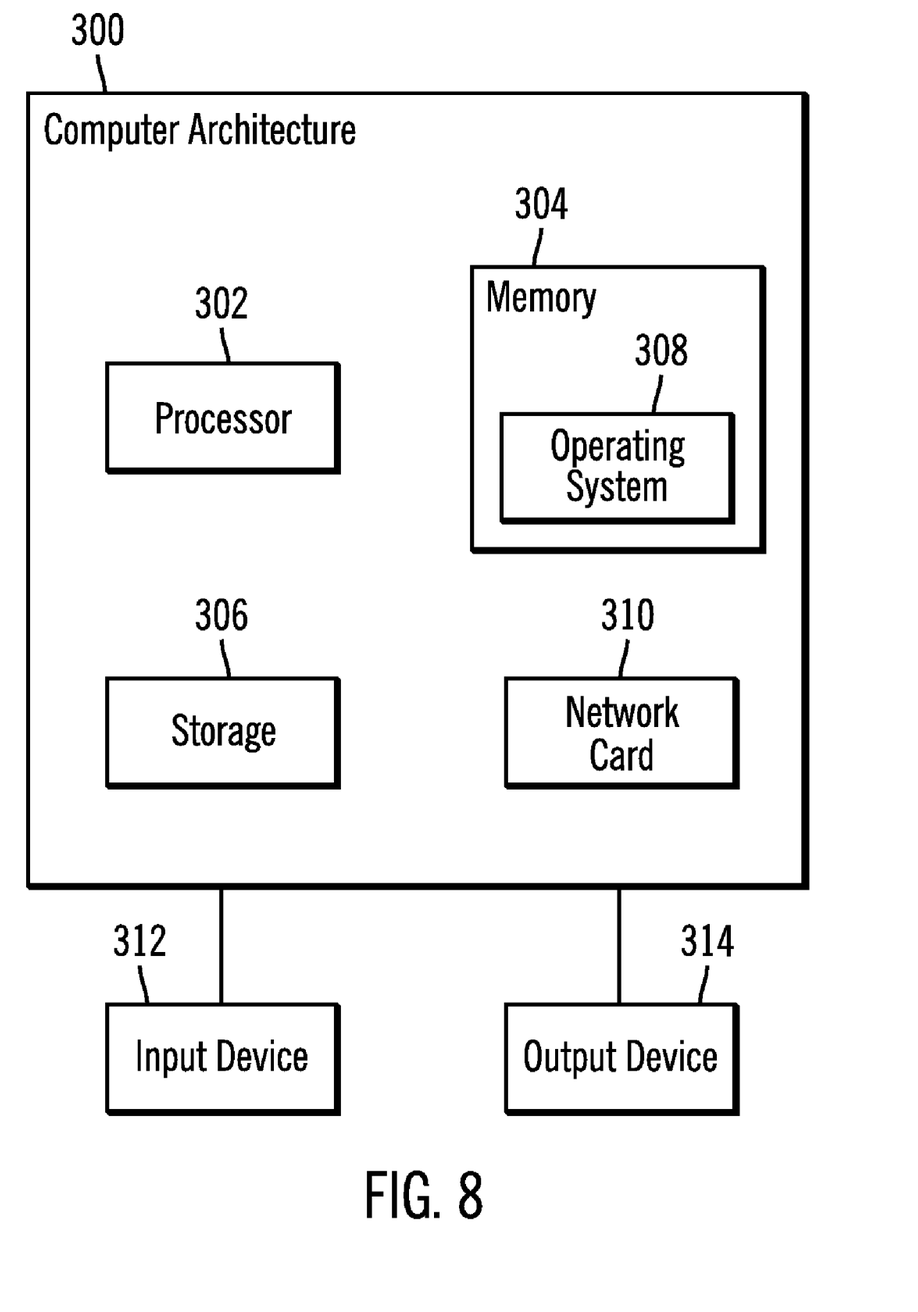
FIG. 8 illustrates an embodiment of an architecture that may be used with the described embodiments.

FIG. 8 illustrates one implementation of a computer architecture 300 that may be implemented in the system 2 in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture including code to perform operations related to testing a graphical user interface (GUI) program, the operations comprising:
    receiving user input defining a plurality of triggers for the GUI program, wherein each trigger associates a user GUI action representing an action a user performs with an input device on the GUI and a GUI object representing a displayed GUI component on which the associated GUI action is performed, wherein execution of the GUI action on the GUI object defined in the trigger causes a shift in a state of the GUI program from one static state to another, and wherein the defined triggers are enabled for reuse in multiple test scenarios;
    receiving user input indicating a first order of at least one of the triggers to test a first scenario of operations of the GUI program, wherein the GUI program executes the GUI actions with respect to the GUI objects defined in the triggers in the indicated first order;
    receiving user input indicating a second order of at least one of the triggers to test a second scenario of operations of the GUI program, wherein the GUI program executes the GUI actions with respect to the GUI objects defined in the triggers in the indicated second order, and wherein at least one of the triggers indicated for the second scenario reuses at least one trigger indicated for the first scenario;
    receiving user input indicating a verification set comprising at least one verification point associated with a GUI state, wherein each verification point in the verification set indicates a verification operation to verify the GUI elements represented at the associated GUI state resulting from the GUI action indicated in one of the triggers;
    executing the triggers defined in the first and second orders to produce GUI states; and
    determining whether GUI elements rendered in the produced GUI states satisfy results expected by the verification point tests to test the GUI program.

2. The article of manufacture of claim 1, wherein each GUI state comprises a representation of GUI elements including at least one GUI object effected by the GUI action executed at the GUI state in the GUI program.

3. The article of manufacture of claim 2, wherein the operations further comprise:
    receiving user input indicating input data to associate with the at least one of the triggers indicated in the first and second orders, wherein the input data associated with one of the triggers is inputted into the GUI elements represented at the GUI state at which the GUI action defined in the trigger is performed, wherein the GUI action is performed in response to entering the input data into the GUI elements represented at the state at which the GUI action is performed.

4. The article of manufacture of claim 2, wherein the triggers defined in the first and second orders comprise trigger sets, wherein for each trigger set, the at least one GUI action indicated in the at least one trigger in the trigger set is executed in a trigger set ordering indicated in the trigger set to cause the GUI program to transition to another GUI state.

5. The article of manufacture of claim 4, wherein at least one of the triggers included in at least one trigger set included in the first scenario is reused in the second scenario.

6. The article of manufacture of claim 1, wherein the verification points are reusable and are used in verification sets in the first and second test scenarios.

7. The article of manufacture of claim 6, wherein the operations further comprise:
    storing the defined triggers and verification points in a library;
    receiving user selection of a trigger and verification point in the library to add to the test scenarios; and
    including in the test scenarios a reference to the selected trigger and verification point in the library.

8. The article of manufacture of claim 1, wherein the received first and second orders of triggers comprise first and second orders of trigger sets, wherein each trigger set includes an ordered set of at least one trigger, wherein for each trigger set, the GUI action indicated in each trigger in the trigger set is executed in the ordering indicated in the trigger set to cause the GUI program to transition to another GUI state, wherein the operations further comprise:
    receiving user input indicating a verification set associated with a GUI state comprising at least one verification point, wherein each verification point in the verification set indicates a test performed at the associated GUI state to determine whether the GUI elements represented at the GUI state are expected.

9. A system, comprising:
    a processor;
    a memory including programs executed by the processor, comprising:
        a Graphical User Interface (GUI) program to test;
        a GUI test automation tool executed to perform operations, the operations comprising:
            receiving user input defining a plurality of triggers for the GUI program, wherein each trigger associates a user GUI action representing an action a user performs with an input device on the GUI and a GUI object representing a displayed GUI component on which the associated GUI action is performed, wherein execution of the GUI action on the GUI object defined in the trigger causes a shift in a state of the GUI program from one static state to another, and wherein the defined triggers are enabled for reuse in multiple test scenarios;

receiving user input indicating a first order of at least one of the triggers to test a first scenario of operations of the GUI program, wherein the GUI program executes the GUI actions with respect to the GUI objects defined in the triggers in the indicated first order;

receiving user input indicating a second order of at least one of the triggers to test a second scenario of operations of the GUI program, wherein the GUI program executes the GUI actions with respect to the GUI objects defined in the triggers in the indicated second order, and wherein at least one of the triggers indicated for the second scenario reuses at least one trigger indicated for the first scenario;

receiving user input indicating a verification set comprising at least one verification point associated with a GUI state, wherein each verification point in the verification set indicates a verification operation to verify the GUI elements represented at the associated GUI state resulting from the GUI action indicated in one of the triggers;

executing the triggers defined in the first and second orders to produce GUI states; and determining whether GUI elements rendered in the produced GUI states satisfy results expected by the verification point tests to test the GUI program.

10. The system of claim 9, wherein each GUI state comprises a representation of GUI elements including at least one GUI object effected by the GUI action executed at the GUI state in the GUI program.

11. The system of claim 10, wherein the GUI test automation tool is further executed to perform:

receiving user input indicating input data to associate with the at least one of the triggers indicated in the first and second orders, wherein the input data associated with one of the triggers is inputted into the GUI elements represented at the GUI state at which the GUI action defined in the trigger is performed, wherein the GUI action is performed in response to entering the input data into the GUI elements represented at the state at which the GUI action is performed.

12. The system of claim 10, wherein the triggers defined in the first and second orders comprise trigger sets, wherein for each trigger set, the at least one GUI action indicated in the at least one trigger in the trigger set is executed in a trigger set ordering indicated in the trigger set to cause the GUI program to transition to another GUI state.

13. The system of claim 9, wherein the GUI test automation tool is further executed to perform:

storing the defined triggers and verification points in a library;

receiving user selection of a trigger and verification point in the library to add to the test scenarios; and including in the test scenarios a reference to the selected trigger and verification point in the library.

14. The system of claim 9, wherein the received first and second orders of triggers comprise first and second orders of trigger sets, wherein each trigger set includes an ordered set of at least one trigger, wherein for each trigger set, the GUI action indicated in each trigger in the trigger set is executed in the ordering indicated in the trigger set to cause the GUI program to transition to another GUI state, wherein the GUI test automation tool is further executed to perform:

receiving user input indicating a verification set associated with a GUI state comprising at least one verification point, wherein each verification point in the verification set indicates a test performed at the associated GUI state to determine whether the GUI elements represented at the GUI state are expected.

15. A method, comprising:

receiving at a computer system user input defining a plurality of triggers for a graphical user interface (GUI) program executed in the computer system, wherein each trigger associates a user GUI action representing an action a user performs with an input device on the GUI and a GUI object representing a displayed GUI component on which the associated GUI action is performed, wherein execution of the GUI action on the GUI object defined in the trigger causes a shift in a state of the GUI program from one static state to another, and wherein the defined triggers are enabled for reuse in multiple test scenarios;

receiving at the computer system user input indicating a first order of at least one of the triggers to test a first scenario of operations of the GUI program, wherein the GUI program executes the GUI actions with respect to the GUI objects defined in the triggers in the indicated first order;

receiving at the computer system user input indicating a second order of at least one of the triggers to test a second scenario of operations of the GUI program, wherein the GUI program executes the GUI actions with respect to the GUI objects defined in the triggers in the indicated second order, and wherein at least one of the triggers indicated for the second scenario reuses at least one trigger indicated for the first scenario;

receiving user input indicating a verification set comprising at least one verification point associated with a GUI state, wherein each verification point in the verification set indicates a verification operation to verify the GUI elements represented at the associated GUI state resulting from the GUI action indicated in one of the triggers;

executing, in the computer system, the triggers defined in the first and second orders to produce GUI states; and determining whether GUI elements rendered in the produced GUI states satisfy results expected by the verification point tests to test the GUI program.

16. The method of claim 15, wherein each GUI state comprises a representation of GUI elements including at least one GUI object effected by the GUI action executed at the GUI state in the GUI program.

17. The method of claim 16, further comprising:

receiving user input indicating input data to associate with the at least one of the triggers indicated in the first and second orders, wherein the input data associated with one of the triggers is inputted into the GUI elements represented at the GUI state at which the GUI action defined in the trigger is performed, wherein the GUI action is performed in response to entering the input data into the GUI elements represented at the state at which the GUI action is performed.

18. The method of claim 16, wherein the triggers defined in the first and second orders comprise trigger sets, wherein for each trigger set, the at least one GUI action indicated in the at least one trigger in the trigger set is executed in a trigger set ordering indicated in the trigger set to cause the GUI program to transition to another GUI state.

19. The method of claim 18, wherein at least one of the triggers included in at least one trigger set included in the first scenario is reused in the second scenario.

20. The method of claim 15, wherein the verification points are reusable and are used in verification sets in the first and second test scenarios.

21. The method of claim 20, further comprising:
storing the defined triggers and verification points in a library;
receiving user selection of a trigger and verification point in the library to add to the test scenarios; and
including in the test scenarios a reference to the selected trigger and verification point in the library.

22. The method of claim 15, wherein the received first and second orders of triggers comprise first and second orders of trigger sets, wherein each trigger set includes an ordered set of at least one trigger, wherein for each trigger set, the GUI action indicated in each trigger in the trigger set is executed in the ordering indicated in the trigger set to cause the GUI program to transition to another GUI state, further comprising:
receiving user input indicating a verification set associated with a GUI state comprising at least one verification point, wherein each verification point in the verification set indicates a test performed at the associated GUI state to determine whether the GUI elements represented at the GUI state are expected.

23. The article of manufacture of claim 1, wherein executing the triggers defined in the first and second orders and determining whether the GUI elements rendered satisfy expected results comprises:
proceeding to a first GUI state resulting from executing the GUI actions on the GUI objects as defined in the triggers in the first order;
performing tests on the GUI elements rendered for the first GUI state to determine whether the GUI elements satisfy expected results;
proceeding to a second GUI state resulting from performing the GUI actions on the GUI objects as defined in the triggers in the second order after executing the triggers in the first order; and
performing tests on the GUI elements rendered for the first GUI state to determine whether the GUI elements satisfy expected results.

24. The system of claim 9, wherein executing the triggers defined in the first and second orders and determining whether the GUI elements rendered satisfy the expected results comprises:
proceeding to a first GUI state resulting from executing the GUI actions on the GUI objects as defined in the triggers in the first order;
performing tests on the GUI elements rendered for the first GUI state to determine whether the GUI elements satisfy expected results;
proceeding to a second GUI state resulting from performing the GUI actions on the GUI objects as defined in the triggers in the second order after executing the triggers in the first order; and
performing tests on the GUI elements rendered for the first GUI state to determine whether the GUI elements satisfy expected results.

25. The method of claim 15, wherein executing the triggers defined in the first and second orders and determining whether the GUI elements rendered satisfy the expected results comprises:
proceeding to a first GUI state resulting from executing the GUI actions on the GUI objects as defined in the triggers in the first order;
performing tests on the GUI elements rendered for the first GUI state to determine whether the GUI elements satisfy expected results;
proceeding to a second GUI state resulting from performing the GUI actions on the GUI objects as defined in the triggers in the second order after executing the triggers in the first order; and
performing tests on the GUI elements rendered for the first GUI state to determine whether the GUI elements satisfy expected results.

* * * * *